Inventor
James A. Maytum
By
Attorney

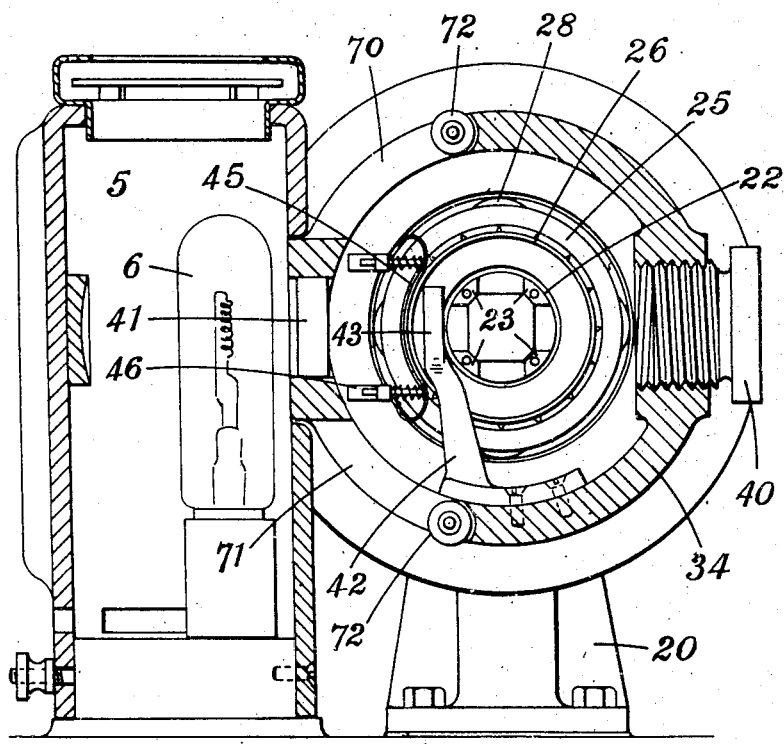

July 19, 1949. J. A. MAYTUM 2,476,503
CONTINUOUS FEED KINEMATOGRAPHIC APPARATUS
Filed March 12, 1945 5 Sheets-Sheet 4
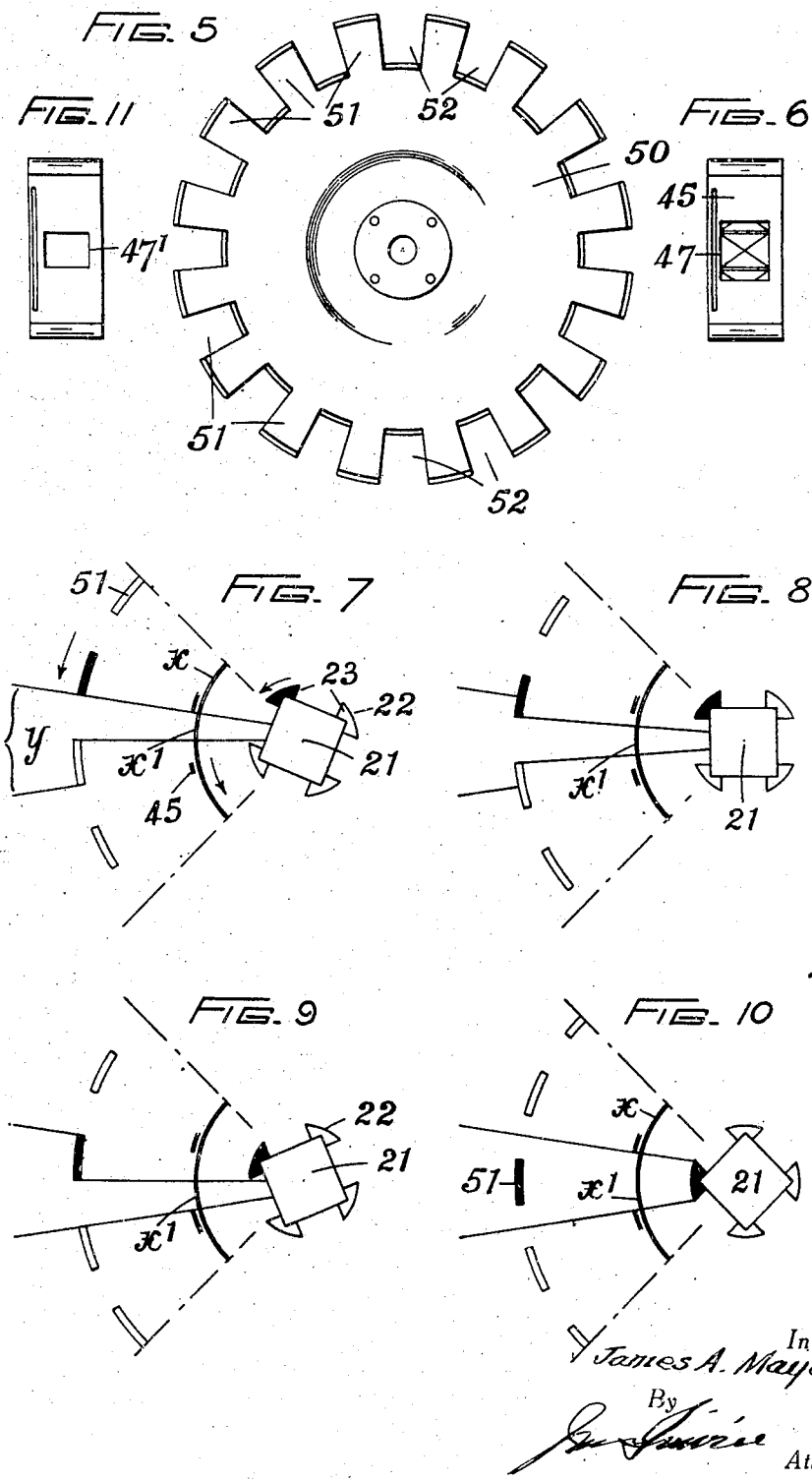

July 19, 1949.  J. A. MAYTUM  2,476,503
CONTINUOUS FEED KINEMATOGRAPHIC APPARATUS
Filed March 12, 1945  5 Sheets-Sheet 5
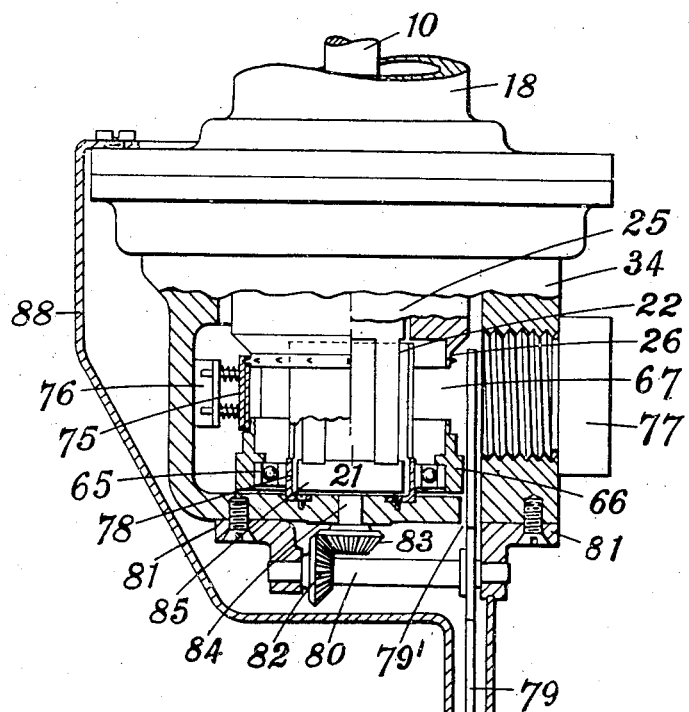
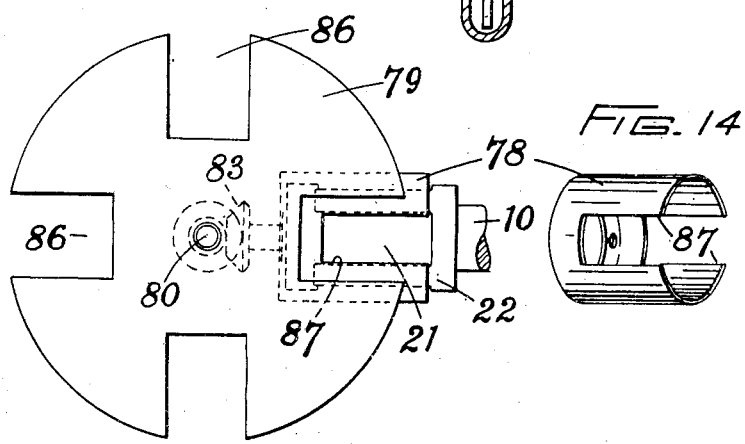
Inventor
James A. Maytum
By
Attorney Patented July 19, 1949

2,476,503

UNITED STATES PATENT OFFICE 2,476,503

CONTINUOUS FEED KINEMATOGRAPHIC APPARATUS

James Archibald Maytum, East Sheen, London, England

Application March 12, 1945, Serial No. 582,396
In Great Britain October 4, 1944

11 Claims. (Cl. 88—16.8)

This invention has reference to improvements in and relating to continuous feed kinematographic apparatus, i. e., projectors and cameras, provided with a rotary compensating prism.

One object of the invention is the provision of continuous feed kinematographic apparatus which projects or takes one picture only at a time. This avoids the production of "ghost" images i. e., superimposed images on the projection screen and, in the case of a camera, on the sensitised film.

A further object of the invention is the provision of continuous feed kinematographic apparatus wherein the rotary prism is of comparatively small dimensions and yet is capable of adequately compensating the film movement.

A still further object of the inventtion is the provision of continuous feed kinematographic apparatus of compact dimensions enabling lenses comprised in the apparatus to be located sufficiently near to each other and to the film to permit of adequate magnification of the necessarily small picture to be projected in the case of a projector and to permit of wide angle lenses and reduction to necessarily small images in the case of a camera.

Another object of the invention is the provision of continuous feed kinematographic apparatus the rotary prism and the sprocket feed means of which whilst being mechanically interconnected to ensure accurate timing relatively are driven with a high degree of steadiness, i. e., with an almost complete absence of ripple or vibration.

Still another object of the invention is the provision of a continuous feed kinematographic projector wherein each film picture is exposed to a projection beam throughout a dimension in the direction of film travel greater than the height of any picture in the film, thus ensuring highly efficient illumination of each film picture.

According to one important feature of the invention continuous feed kinematographic apparatus is provided with a regular four sided (i. e., square section) rotatable compensating prism and a shutter associated therewith, said shutter being adapted to confine scanning of the light beam by the prism to any one facet of the prism at a time.

Another important feature of the invention resides in providing kinematographic apparatus with a regular four-sided (i. e., square section) rotatable compensating prism and continuous feed means for film, the rate of rotation of said prism being such that the angle through which it travels whilst scanning any point on a film picture area fed past it by the said means is equal to four times the angle at the centre of rotation of the prism subtended by the path of movement of the said point during the scanning.

The invention and some important objects thereof will now be described with reference to the accompanying drawings wherein:

Fig. 3 is a sectional side elevation of the said parts taken on the line III—III, Fig. 2;

Fig. 5 is a face view of an external shutter adapted at critical moments to prevent the simultaneous illumination of two successive film pictures by a projection beam having at the film and in the direction of film travel a dimension greater than the height of any picture of the film;

Fig. 6 is a face view of a pressure and projection aperture plate for use in association with an external shutter such as that shown in Fig. 5;

Figs. 7 to 10 show four successive stages at the operation of the projector;

Fig. 11 is a face view of a pressure and projection aperture plate wherein the aperture is of the same size as a film picture;

Fig. 12 is a plan view, partly in section, of the principle parts of a camera according to the invention;

Fig. 13 is a detail showing the exposure shutter in face view in front of a mask and the rotary prism of the camera shown in Fig. 12; and Fig. 14 is a perspective view of the said mask.

Figure 1:
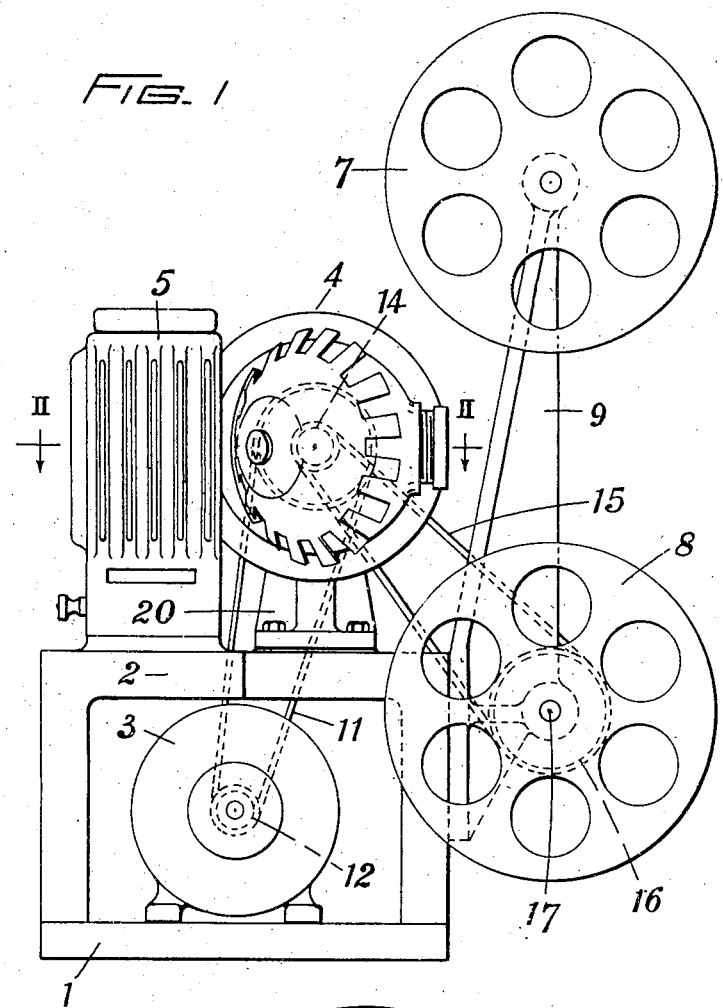
Fig. 1 is a side elevation of a projector according to the invention.
Figure 4:
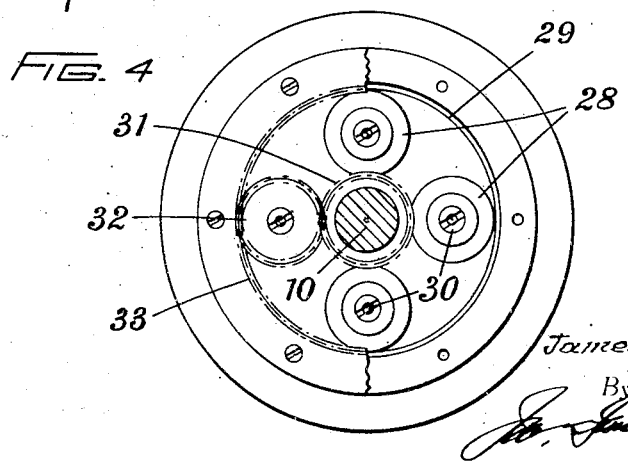
Fig. 4 is an end elevation of an epicyclic reduction gear for transmitting a 4:1 drive from a shaft driving the compensating prism to a film-feed sprocket wheel.

The projector shown comprises a base 1, a table 2, a driving motor 3, a projection unit 4, lamp housing and lamp indicated by 5 and 6, respectively, and feed and take-up spools 7 and 8, respectively, the motor and the table being mounted on the base 1, and the unit 4, lamp housings and lamp 6, and a bracket 9 for the said spools 7 and 8, all being mounted on the table. The motor drives the main shaft 10 of the unit 4 by a belt 11 and pulleys 12 and 13 and, through a pulley 14 on the main shaft, drives a belt 15 and a pulley 16 on the shaft 17 to drive the takeup spool 8. Part 18 of the casing of the unit 4, which part contains bearings 19 for the main shaft 10, is rigid with a column 20 which is secured to the table 2.

The compensating prism of regular four sided form, i. e., square section, the transverse dimension of each side or longitudinal facet of which is but slightly greater than the height of a film picture to be projected. The prism is mounted within a shutter 22 comprising four blades 23. The blades are symmetrically arranged around the axis of the shaft 10 and their inner longitudinal parts engage with the chamfered corners of the prism. Thus, the prism is located with its longitudinal axis coincident with the axis of the main shaft 10. The opposite faces of successive blades are parallel and, therefore, at right angles to the prism facet between them; this is clearly shown in Figs. 3 and 7 to 10. When the main shaft is rotated the prism and the shutter 22 are rotated therewith.

The sprocket wheel 25 co-axially surrounds the main shaft 10 at the prism end thereof, and its toothed part 26 co-axially surrounds the prism and shutter 22 near the shaft end of these two elements. It is driven from the shaft 10 by 4:1 epicyclic reduction gearing of friction form. This gearing comprises a sun wheel 27 rigidly surrounding the shaft 10 between the sprocket wheel and the adjacent bearing 19, four equally spaced plant wheels 28 and a fixed outer race 29 for the said planet wheels. The planet wheels 28 rotate on axles 30 projecting from one side of the sprocket wheel. Frictional engagement between the wheels 27 and 28 and between the wheels 28 and the race 29 ensure travel of the axes 30 of the wheels 28 around the axis of the shaft 10 and the relative dimensions of the wheels are such that the angular velocity of the said axes is equal to one quarter that of the shaft 10, the directions of rotation being in the same sense. Thus, as the axles 30 are rigid with the sprocket wheel 40 the said wheel rotates with the prism but at one-fourth the rate thereof.

The object of providing the reduction gearing just described is to ensure the precisely timed relation between the prism and the sprocket wheel and to absolutely preclude vibration or ripple both in the prism and in the sprocket wheel, as such vibration or ripple would be detrimental to the projection of clear pictures. This relative timing of the sprocket wheel and prism, and the setting of the teeth in relation to the prism facets, ensures that the pictures of inserted film are always correctly framed, it being usual practice in the art always to locate perforations in the films at the same position with respect to the top and bottom edges of the pictures. Initially, the sprocket wheel is so set in relation to the prism facets that the centre of any picture of film in mesh with the wheel teeth substantially coincides with the optical axis of the projector when the longitudinal centre line of any facet intersects the said line and, for reasons which will become more apparent as the description proceeds, it is necessary always to maintain this setting. Therefore, to obviate the occurrence of slip in the epicyclic friction gear, toothed gearing is incorporated in the friction gear. This toothed gearing consists of a toothed sun wheel 31 rigid with the sun wheel 27, a toothed plant wheel 32 borne by one of the axles 30 and an internally toothed circumscribing wheel 33 rigid with the race 29, wheel 32 being in mesh with wheel 31 on the one hand and with wheel 33 on the other, and said toothed wheels having the same reduction ratio, 4:1, as the friction gearing. The toothed gearing, being positive, prevents slip but as the main drive is through friction elements, as described, vibration or ripple owing to the toothed gearing is not sensible either at the prism or at the sprocket wheel.

The outer race 29 of the reduction gear is fixed in place in the unit by a cup-like casing part 34 which is stepped internally at 35 to grip the external flange 36 of the said race when the part 34 is pulled up to the flange 37 on the part 18 by screws 38.

The casing part 34 is bored and screw-threaded at one side to hold the focussing segment 40 of the lens system of the projector, is bored at the diametrically opposite side for the condenser 41, the prism 21 being between these elements 40 and 41, and supports a bracket 42 having a carrier 43 for the correcting cell of the objective, the location of the bracket being such that the said cell lies between the prism and that part of the sprocket wheel round which film passes. The optical components and the prism are, of course, collimated.

The part of the sprocket wheel around which film passes is disclosed by the pressure plate 45. This plate, which is borne by brackets 46 secured to the casing part 34, has a projection aperture 47 in it, the dimension of which, in the direction of film travel, preferably is appreciably greater than the height of a single picture or frame. This is indicated in Fig. 6. The object of this long aperture is to enable the time of projection of each picture to be effected for a longer period than it would be were a projection aperture $47^1$ of the size shown in Fig. 11 used. However, the present invention embraces the use of the smaller aperture.

Figure 2:
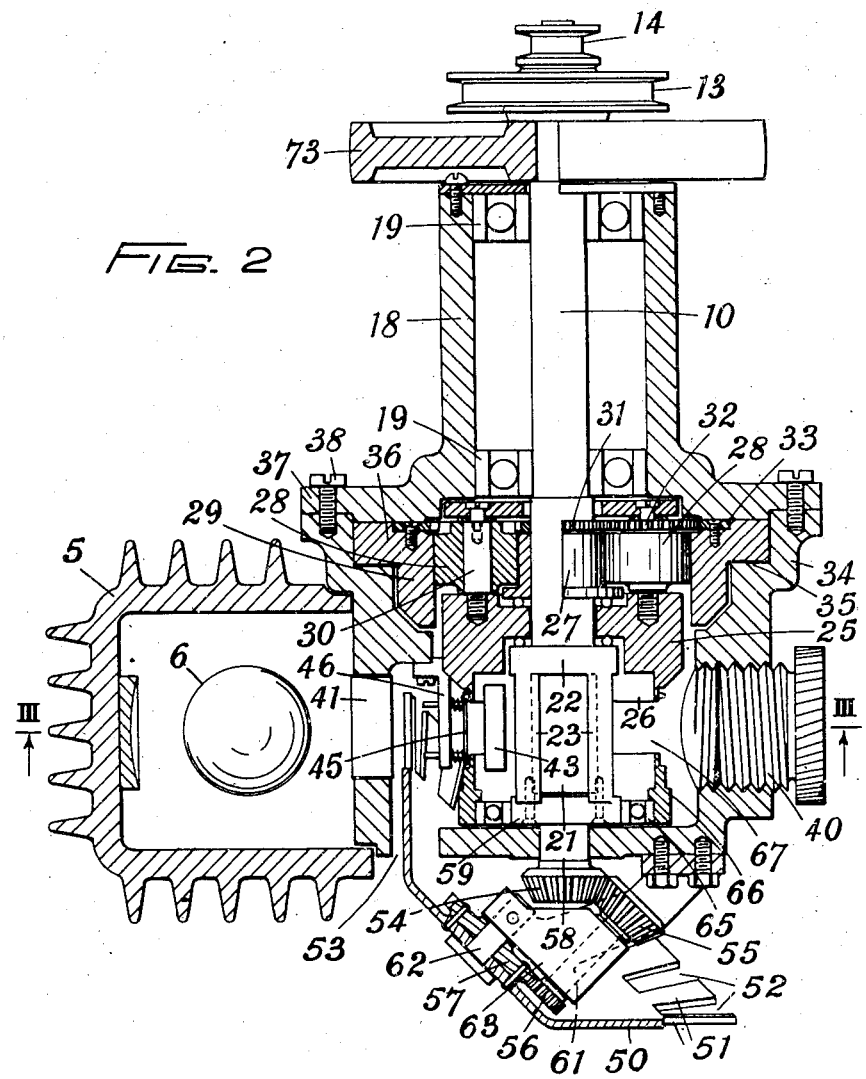
Fig. 2 is a sectional plan of the principle parts of the said projector taken on the line II—II, Fig. 1.

When the longer aperture is used it is necessary to provide means which prevents the simultaneous projection of correctly framed pictures; and when the smaller aperture is used the provision of said means is desirable as otherwise an image of the smaller aperture flickers on the screen. One such means comprises the second or external shutter 50. This shutter has sixteen blades 51 between which are gaps 52 of the same size as the blades. It will be seen, more particularly by reference to Fig. 2, that the bladed part of the shutter cuts the projection beam between the lamp 6 and the pressure plate 45, the casing part 34 being apertured at 53 to permit of the entry of the shutter 50 thereinto. The shutter is driven from the shaft 10 at the same rate as the sprocket wheel by means comprising 1:1 bevel gearing 54—55 and 4:1 spur gearing 56—57. Bevel wheel 54 is rigid with a flanged spigot 58 fixed to those ends of the internal shutter blades 23 furthest from the shaft 10 by means of its flange 59 and screws, said spigot extending through and beyond the adjacent end of the casing part 34. The bevel wheel 55 and the spur wheel 56 are fixed to opposite ends of a rotatable shaft 61, and the spur wheel 57 and the shutter 50 are rotatably borne by a stub 62, said shaft 61 and said stub 62 being mounted in a bracket 63 secured to the part 34. The spigot 58 is, of course, co-axial with the shaft 10.

The flange 59 of the spigot is surrounded by a bearing 63 supporting a guide wheel 66 for the margin of film opposite to that supported by the sprocket wheel; and the space 67 between the opposite edges of these two wheels is sufficient to permit of the passage to and from the prism of the projected image.

The part 34 of the casing is open at 70—71 for the entry of film to and the exit of film from the projection unit; and film guide rollers 72 are arranged at the front ends of the openings, said rollers being on pins supported by the casing part 34.

An impedance wheel 73 is fixed to the shaft 10 adjacent to the pulley 13.

The manner in which compensating prisms operate in kinematographic apparatus is known so a detailed description of the operation of the prism 21 is though to be unnecessary. However, attention is called to the facts that in order to enable one facet to receive one picture, the next facet the next picture and so on of a prism that can be used with lenses of short focus, and to enable the facets to receive the whole of the effective portion of the light beam throughout a large angle (e. g., about 60°) of prism rotation, the angle through which the prism turns, while any one facet on its outer side receives light from the projection beam, is equal to four times the angle subtended by the path of movement of any point on the film picture being scanned by the said facet (the subtended angle being regarded as located at the centre of rotation of the prism). In addition, the prism is given the comparatively small dimensions shown, the drawings being substantially to scale, and is located in the vicinity of the most concentrated zone of the beam (i. e., in the vicinity of the principal point of the optical system).

The manner in which the prism, the shutter 22, the film, the projection aperture plate 45, the shutter 50 and the projection beam $y$ co-operate during projection will now be described with reference, more particularly, to Figs. 7 to 10. The showing in Figs. 7, 8, 9 and 10 represent immediately successive increments of movement of the film and shutter 50 as a unit and the prism and prism shutter 22 as a unit, so that considering Fig. 7 as a starting point for the purpose of the description, Fig. 8 shows the next successive position, Fig. 9 successive in position to Fig. 8, and Fig. 10 in successive position to Fig. 9. Assuming the parts in regular successive phase, the shutter 50 and film $x$ are shown in Fig. 8 in a position after moving 5.625° from the position shown in Fig. 7, while the prism and shutter 22 are in position after moving 22.5° from their positions in Fig. 7. This same relation of movement is indicated in Fig. 9 from that in Fig. 8 and in Fig. 10 from that in Fig. 9. As the prism and shutter 22 are driven four times faster than the shutter 50 and film $x$, the shutter 50 and film $x$ move in the illustration through 5.625° at the same interval of time in which the prism and shutter 22 are moving through 22.5°. The shutter 50 may be regarded as operating in synchronism with the film while the shutter 22 and the prism move at four times synchronous speed. The shutter blades which come into operation during the phase represented by the said figures are shown in solid black. The direction of rotation of the parts is indicated by the arrows in Fig. 7. Only that portion of the projection beam $y$ which can pass through the projection aperture is indicated, extraneous portions of the beam being ineffective in projection, and, therefore, not being indicated.

In Fig. 7 the upper portion only of the projection beam $y$ reaches the prism, illuminating the middle and top part of the film picture $x^1$ in its path. At the next stage shown the solid black blade 51 and the preceding blade of the outer shutter confine the middle of the beam $y$ to the picture nearly the whole of which is illuminated.

At the next stage shown, Fig. 9, the lower half of the projection beam $y$ illuminates the middle of the picture $x^1$ and the lower part thereof, the upper half of the beam $y$ being cut off by the solid black blade 51. Finally, Fig. 10, the solid black blade 51 blocks out the centre only of the beam $y$ but at this moment the whole of the solid black blade 23 of the internal shutter 22 is in full operation—it blocks out in relation to the prism all light which passes through the aperture 47, the outer facial dimensions of each of the blades 23 being slightly greater than the height and width of the beam $y$ where it strikes the blades, as shown.

The correcting cell is not shown in these figures as it does not affect the principle on which the elements co-operate.

When the solid black blade 51 is in the centre of the beam $y$ (Fig. 10) two successive pictures are illuminated but owing to the blade 23 the light does not reach the prism. Therefore so-called ghost images are not projected. Moreover, the moment indicated in Fig. 10 is the moment which intervenes the transition of the beam from one prism facet to the next and the moment which intervenes the transition of projection from picture $x^1$ to the immediately succeeding picture.

In addition to the blades 23 of the shutter 22 preventing scanning by more than one facet at any time the said shutter cuts off some of the light which does not pass directly from the scanning facet to the opposite, parallel facet and also cuts off some of the internally reflected light, the cutting off being effected by those faces (the inner faces) of the blades 23 nearest the prism. Other light which does not pass directly from the scanning facet to the opposite, unobstructed part of the parallel facet is trapped internally of the projection unit, or in the case of the camera to be explained hereinafter, is trapped by a mask.

From the foregoing it will also be clear that the whole of each picture—which is of considerably greater height than the margin between any two pictures—is projected. This result is obtained owing to the fast-moving shutter 22 and its timing and setting in relation to the film pictures and bands.

As will be seen and as previously stated the projection aperture is of greater height than any single picture, but each picture, but only one picture at a time, is projected while passing the aperture. Thus, each picture is more efficiently illuminated than it would be were the aperture shown in Fig. 11 used. This result is made possible without the simultaneous projection of two pictures by the co-ordinated action of the external shutter 50, the projection aperture and the sprocket wheel 25, and the internal shutter 22.

The blades of the external shutter are equal in height to half the height of the effective portion of the beam (the portion which can pass through the projection aperture) where they cut it and the gaps 52 are of the same size as the blades; the sprocket wheel moves the film at the same angular rate as the blades; and the shutter 22 blocks out the light when two pictures are illuminated. Hence at no time can two pictures or parts of two pictures be projected simultaneously in spite of the fact that the effective height of the beam at the film is greater than the height of one picture.

If the smaller aperture, Fig. 11, be used the external shutter is desirable but not necessary but the necessity for the internal shutter 22 remains when the larger aperture is used in order to prevent the simultaneous projection of parts of two pictures at certain moments.

The camera comprising the parts shown in Figs. 12, 13 and 14 is similar in essentials to the projector. More particularly, it has the prism 21, the shutter 22, sprocket wheel 25 and counter wheel 66 therefor, the casing parts 18 and 34 (but the part 34 in Fig. 12 has no slot 53) and the 4:1 epicyclic reduction gear between the drive shaft (10) and the sprocket wheel 25.

The pressure plate 75 of the camera is carried by a bracket 76 mounted on one side of the part 34 and the lens tube 77 of usual construction is mounted on the opposite side thereof. The bearing 65 for the counter wheel 66 is mounted on a mask 78 to be described.

The camera has an exposure shutter 79 operative immediately behind the lens tube, the part 34 being slotted at 79$^1$ to permit the shutter, which is mounted externally of the said part, to enter it. The said shutter mounting (and the drive therefor) comprises a shaft 80 borne by brackets 81 fixed to the casing part 34, and a mitre wheel 82 on the shaft in mesh with a mitre wheel 83, said mitre wheel 83 being on a spigot 84 which projects through the end of the part 34 and which is secured by means of a flange 85 at its inner end to the shutter 22. The spigot and the shaft 10 are co-axial. When the shaft 10 rotates the shutter 79 rotates with it at the same rate. The shutter is so set that the gaps 86 in the shutter 79 successively expose successive prism facets to the exposure beam from the lenses in the tube 77 as will be clear by reference, more particularly, to Fig. 13.

The mask 78 comprises a hollow cylinder which closely surrounds the shutter 22 and the prism but does not contact with them and does not rotate. The cylinder is slotted at 87 at diametrically opposite sides, the slot on the film side of the mask being substantially equal to the height of any image area of the sensitised film and the height of the other slot being at least equal to that of the said slot at the film side of the mask. The said mask is secured to the part 34 with the slots 87 in such a position that their common central plane contains the optical axis of the collimated exposure lenses and compensating prism.

A light-tight casing 88 encloses the elements as shown and is, of course, extended to enclose the film spools and film for obvious reasons.

The manner in which the camera operates is thought to be obvious having regard to the description already given relative thereto and relative to the projector. It may be mentioned, however, that the picture images produced are similar in size and spacing to those of standard film as illustrated, for example, in Figs. 6 to 10; at no time are two images or parts of two images cast on the film simultaneously (owing to the provision of the shutter 22); the prism is adjacent to the principal point of the optical system; and the mask in addition to acting as a framing aperture prevents leakage past the prism of any light wrongly refracted or reflected by the latter and not blocked by the inner surfaces of the shutter blades 23.

What I claim is:

1. In kinematographic apparatus a continuous feed including a regular rotatable compensating prism, means comprising a shaft for rotating said prism, said shaft being rigid with the prism, a shutter associated with the prism, a continuous feed sprocket wheel for film and 4:1 epicyclic reduction gearing between said shaft and said sprocket wheel, said shaft driving the prism at a rate such that the angle through which the prism turns while scanning any point on the film picture area fed past it by the said feed means is equal to four times the angle at the axis of rotation of the prism subtended by the path of movement of the said point during the scanning and said shutter being arranged to confine scanning of the light beam by the prism to any one prism facet at a time, said reduction gearing being of friction type and having an inner race co-axial with the axis of rotation of the prism, and a fixed outer race and axles for its planet wheels, said axles being mounted on the sprocket wheel.

2. In kinematographic apparatus according to claim 1, wherein means are associated with said gearing adapted to prevent slip.

3. In kinematographic apparatus according to claim 1, wherein toothed slip-preventing gearing are provided in said epicyclic gearing, said toothed gearing comprising a sun wheel rigid with and co-axial with said inner race, a planet wheel mounted on one of said axles and an internally toothed outer wheel rigid with said outer race.

4. In continuous feed kinematographic apparatus a main shaft, means for driving said main shaft, a regular compensating prism rigid with the main shaft, the longitudinal axis of the prism being coincident with the longitudinal axis of the shaft, a shutter blade at each corner of the prism, means for projecting a light beam onto the prism facets, each of said blades being of a size to wholly but momentarily intercept said beam as the prism rotates, a film feed sprocket wheel surrounding said prism, 4:1 reduction epicyclic friction gearing between said shaft and said sprocket wheel whereby the sprocket wheel is driven at one fourth the rate of the shaft, and means associated with said gearing adapted to prevent slip.

5. In continuous feed kinematographic apparatus including a regular rotatable compensating prism, means for rotating said prism, a shutter associated with the prism, continuous feed means for film including a film feed sprocket wheel around and located co-axially of the prism and engaged with a marginal part only of the film, and means for driving said sprocket wheel at one fourth the angular velocity of the prism, the prism rotating means operating the prism at a rate whereby the angle through which the prism turns while scanning any point on the film picture area fed past it by the said feed feed means is equal to four times the angle at the axis of rotation of the prism subtended by the path of movement of the said film point during the scanning, said shutter confining scanning of the light beam by the prism to only one prism facet at a time.

6. In continuous feed kinematographic apparatus including a regular rotatable compensating prism, means for rotating said prism, a shutter associated with the prism, continuous feed means for film including a film feed sprocket wheel and a film guide wheel, said wheels being arranged around the prism and spaced apart axially to enable light to pass between them to the prism, said sprocket wheel engaging with a marginal part only of the film and said guide wheel engaging with the opposite marginal part of the film, and means to drive said sprocket wheel at one fourth the angular velocity of the prism, the prism rotating means operating the prism at a rate whereby the angle through which the prism turns while scanning any point on the film picture area fed past it by the said feed means is equal to four times the angle at the axis of rotation of the prism subtended by the path of movement of the said film point during the scanning, said shutter confining scanning of the light beam by the prism to only one prism facet at a time.

7. A continuous feed kinematographic apparatus comprising a shaft, means for driving said shaft, a regular compensating prism rigid with the shaft, the longitudinal axis of the prism being coincident with the longitudinal axis of the shaft, means for projecting a light beam onto the prism facets, a shutter blade fixed at each corner of the prism, each of said blades being of a size to wholly intercept said beam as the prism rotates, a film feed sprocket wheel rotatably mounted on said shaft and surrounding said prism, and drive transmitting means between said shaft and said sprocket wheel for driving said sprocket wheel in synchronism with said prism.

8. A continuous feed kinematographic apparatus comprising a shaft, means for driving said shaft, a regular compensating prism rigid with the shaft, the longitudinal axis of the prism being coincident with the longitudinal axis of the shaft, means for projecting a light beam onto the prism facets, a shutter blade fixed at each corner of the prism, each of said blades being of a size to wholly intercept said beam as the prism rotates, a film feed sprocket wheel rotatably mounted on said shaft and surrounding said prism, drive transmitting means between said shaft and said sprocket wheel for driving said sprocket in synchronism with said prism, a shutter positioned beyond said sprocket wheel to intercept said light beam, and means between said shutter and said shaft for driving said shutter in synchronism with said prism.

9. A continuous feed kinematographic apparatus comprising a shaft, means for driving said shaft, a regular compensating prism rigid with the shaft, the longitudinal axis of the prism being coincident with the longitudinal axis of the shaft, means for projecting a light beam onto the prism facets, a shutter blade fixed at each corner of the prism, each of said blades being of a size to wholly intercept said beam as the prism rotates, a film feed sprocket wheel rotatably mounted on said shaft and surrounding said prism, drive transmitting means between said shaft and said sprocket wheel for driving said sprocket wheel in synchronism with said prism, a shutter positioned beyond said sprocket wheel to intercept said light beam, and means connected with said shaft for driving said shutter at the same speed as that of said sprocket wheel.

10. In a kinematographic apparatus, the combination with a lens and an apertured film gate, of a continuous feed including means for continuously moving a film past the aperture in said gate, a regular compensating prism rotatably mounted between said lens and gate, a shutter surrounding the prism to block the corners thereof and rotatable therewith, and means for rotating said prism and shutter at a speed related to that of the film, said shutter confining scanning of the light beam by the prism to only one prism facet at a time, and a stationary cylindrical mask closely surrounding the prism and having two diametrically opposite gaps the longitudinal center lines of which lie in the optical axis of said lens, the height of the gap at the film side of the prism being substantially equal to the height of an image area of the film and the height of the other gap being at least as large as the height of said image area.

11. A continuous feed kinematographic apparatus comprising a shaft, means for driving said shaft, a regular compensating prism rigid with the shaft, the longitudinal axis of the prism being coincident with the longitudinal axis of the shaft, means for projecting a light beam onto the prism facets, a shutter blade fixed at each corner of the prism, each of said blades being of a size to wholly intercept said beam as the prism rotates, a film guide means for positioning the film in a path transverse the optical axis of said prism, means for moving said film along said path, drive transmitting means between said shaft and said film moving means for moving said film in synchronism with said prism, a shutter positioned between said light beam projecting means and said film path to intercept said light beam, and means between said shutter and said shaft for driving said shutter in synchronism with said prism.

JAMES ARCHIBALD MAYTUM.

REFERENCES CITED

The following references are of record in the file of this patent:

UNITED STATES PATENTS

| Number | Name | Date |
| --- | --- | --- |
| 1,341,108 | Burnett | May 25, 1920 |
| 1,646,341 | Baradat | Oct. 18, 1927 |
| 1,699,169 | Thurstone | Jan. 15, 1929 |
| 1,928,623 | Holst | Oct. 3, 1933 |
| 1,974,423 | Holst et al. | Sept. 25, 1934 |
| 2,004,120 | Leventhal | June 11, 1935 |
| 2,013,661 | Leventhal | Sept. 10, 1935 |
| 2,168,433 | Parvopassu | Aug. 8, 1939 |
| 2,147,076 | Hickman | Mar. 11, 1947 |

FOREIGN PATENTS

| Number | Country | Date |
| --- | --- | --- |
| 637,220 | France | Jan. 24, 1928 |
| 550,665 | Germany | May 13, 1932 |
| 564,557 | Germany | Nov. 19, 1932 |
| 472,013 | Great Britain | Sept. 15, 1937 |